Nov. 9, 1948.   H. R. SODEN   2,453,600
INDEXING MECHANISM
Filed July 13, 1944   4 Sheets-Sheet 1

INVENTOR.
BY   HAROLD R. SODEN
Leigh W. Wright.
ATTORNEY.

Nov. 9, 1948.    H. R. SODEN    2,453,600
INDEXING MECHANISM

Filed July 13, 1944    4 Sheets-Sheet 2

INVENTOR.
BY    HAROLD R. SODEN
    Leigh W. Wright
        ATTORNEY.

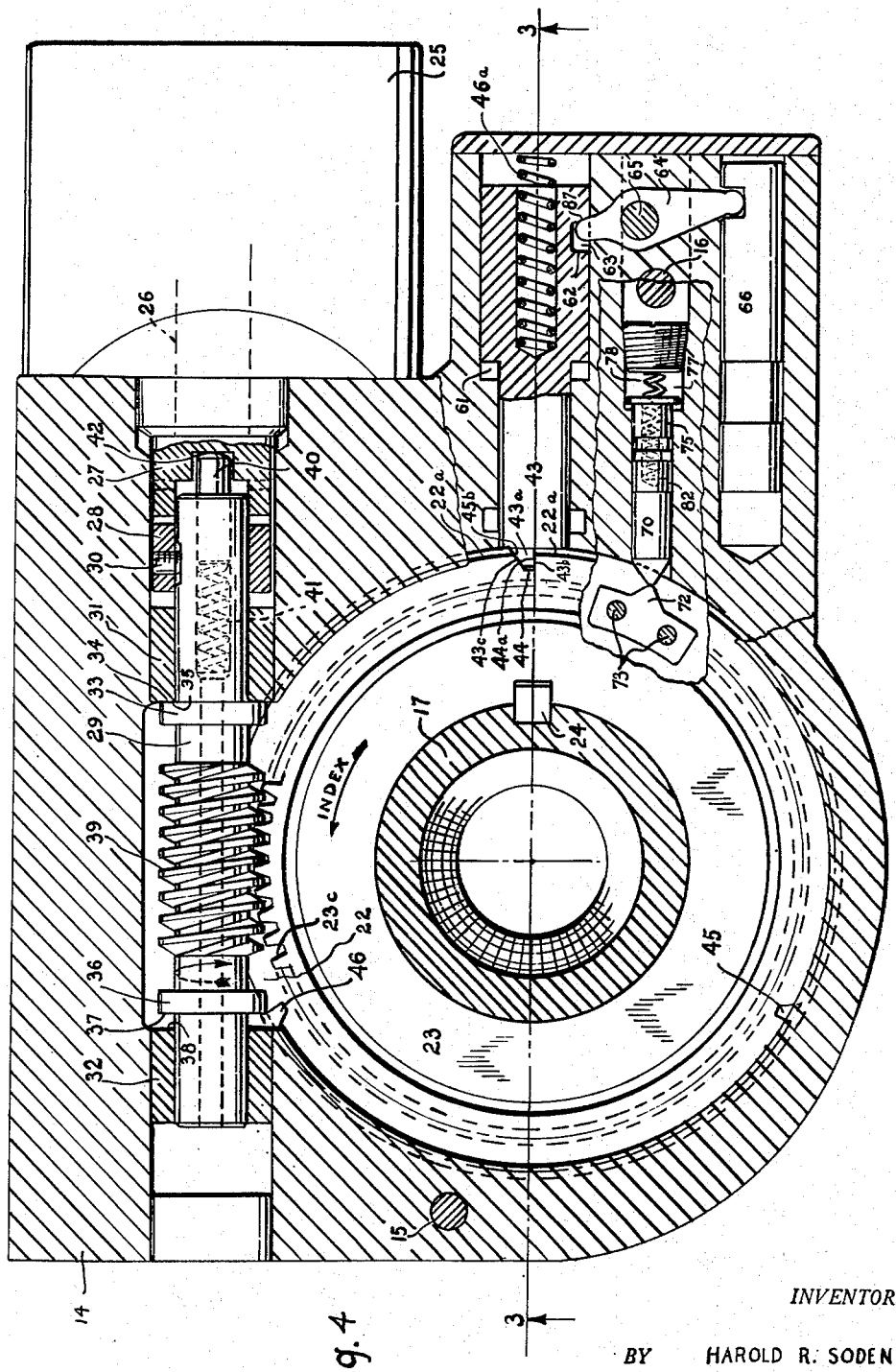

Patented Nov. 9, 1948

2,453,600

UNITED STATES PATENT OFFICE 2,453,600

INDEXING MECHANISM

Harold R. Soden, Cincinnati, Ohio, assignor to The Cincinnati Milling Machine Co., Cincinnati, Ohio, a corporation of Ohio Application July 13, 1944, Serial No. 544,778

15 Claims. (Cl. 90—56)

This invention relates to machine tools and more particularly to improvements in milling machines.

One of the objects of this invention is to provide an improved rotary indexing table attachment for milling machines and the like.

Another object is to provide an improved hydraulically actuated indexing work table for a milling machine which is rapid, accurate, and safe in operation.

Still another object of this invention is to provide a rotary work table for a milling machine which is automatically hydraulically indexed to various working positions by trip mechanism operated by the movement of a machine member.

And a further object is to provide a rotatable work support with indexing mechanism which includes a positive stop defining each index position, a drive motor, and a yieldable drive connection between the motor and support to facilitate rapid and positive indexing of the support.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 4 is a diagrammatic enlarged sectional view substantially on the lines 4—4 in Figures 2 and 3.

Figure 1:
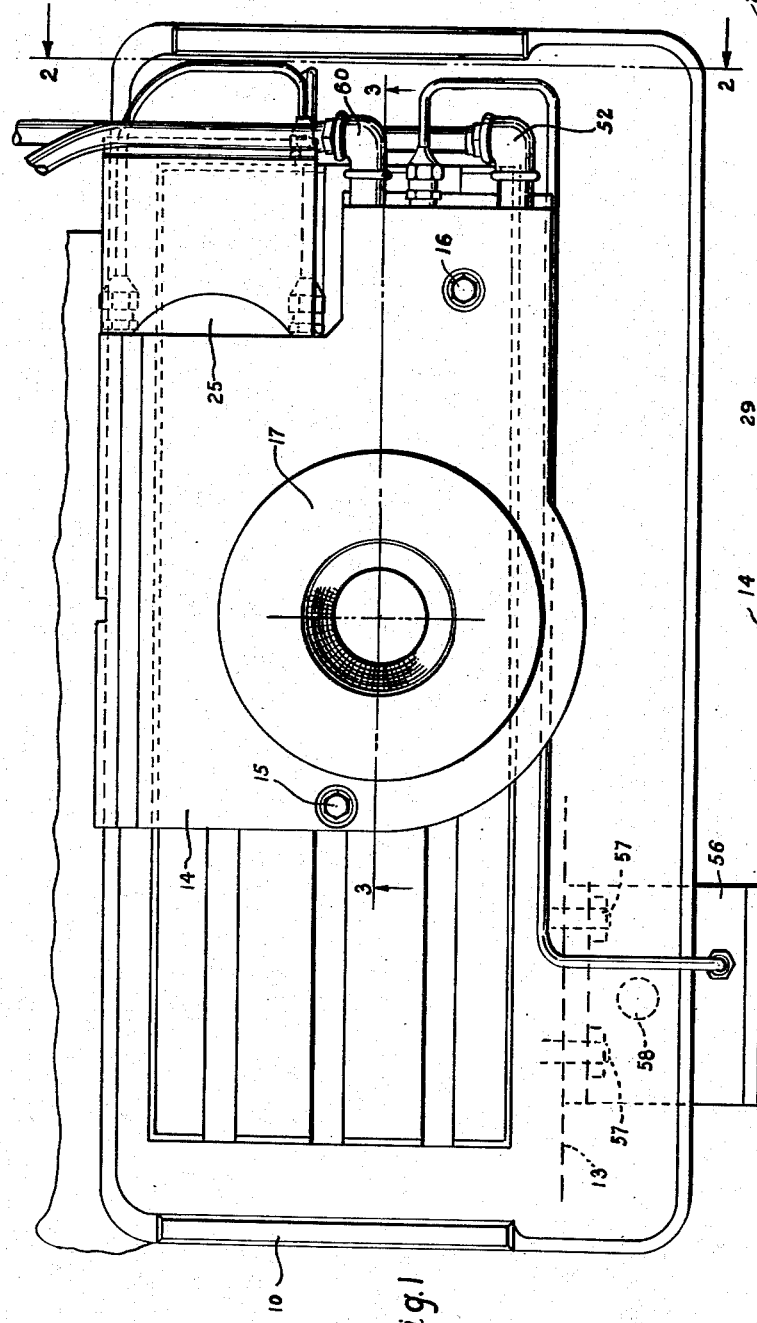
Figure 1 is a fragmentary plan view of a portion of a milling machine showing the work table with a rotatable work support or index base embodying this invention mounted thereon.

For exemplary purposes this invention is shown applied to an index base or rotary indexing work holder attachment which may be placed upon a machine tool or milling machine work table 10 for positioning work in various circumferential positions for performing machining operations thereon. The work table 10 is mounted on appropriate guideways 11 and 12 on the base or frame 13 of the machine tool.

The indexing work holder is carried in a housing 14 mounted on the work table 10 by T-slot bolts 15 and 16 and carries the rotatable index base or work holder 17 which is journaled in suitable bearings 18 and 19 formed in the housing 14 and confined against axial movement by a nut 20 appropriately threaded at 21 on the rotary work holder 17 and which nut 20 abuts against the index notch disc 22 and the worm wheel 23, both of which are keyed in driving relationship on the work holder 17 by a suitable key 24. By adjusting the nut 20 the face 23a of the worm wheel 23 may be brought into proper running contact with surface 23b of the housing 14.

The rotary work holder 17 is driven to its various indexed positions by means of a hydraulic indexing motor 25 of any conventional design mounted on the housing 14 and having an output drive shaft 26, Figure 4, on the outer end of which is fixed a tongue and groove clutch member 27 operating in driving relationship with a mating tongue and groove clutch member 28 rigidly fixed on the worm shaft 29 by set screw 30. The worm shaft 29 is journaled in suitable bearings 31 and 32 carried in the housing 14 and has limited axial movement therein determined in one direction by an integral collar 33 having an abutment surface 34 adapted to engage the face 35 of the bearing 31 and limited in movement in the other direction by an integral collar 36 having an abutment surface 37 adapted to engage the surface 38 of the bearing 32. This relative axial movement of the worm shaft 29 between the bearings 31 and 32 as limited by the collars 33 and 36 is permitted by the tongue and groove clutch members 27 and 28 while the worm shaft 29 may at all times be driven by the hydraulic indexing motor 25.

Formed on the worm shaft 29 is a suitable worm 39 which meshes with the teeth 23c of the worm wheel 23 on the rotary work holder 17. Coaxially of the worm shaft 29 is provided a plunger 40 which is urged outwardly, Figure 4, by a suitable compression spring 41 into engagement with an abutment surface 42 in the end of the hydraulic motor shaft 26 so as to normally urge the worm shaft 29 and its worm 39 axially or longitudinally in normal driving or indexing direction to move the abutment surface 37 of the collar 36 into engagement with the surface 38 of the bearing 32 during the free rotation of the rotary work holder 17.

The rotary work holder 17 is accurately positioned in desired indexed locations by the engagement of the locking bolt or plunger 43 with index notches 44, 45, and 46 of any number or desired location formed in the index disc 22, Figure 4. The plunger 43 has an end portion 43a with a radial abutment surface 43b which cooperates with a mating radial abutment surface 44a formed in the index disc 22. The end portion 43a also has a tapered side portion 43c cooperating with the tapered side 45b of each index notch 44 so that when the plunger 43 is forced towards the index disc by the compression spring 46a, the end portion 43a, when positioned in one of the index notches, will accurately determine an index position of the work holder 17 by the engagement of the abutment surface 43b on the plunger with the surface 44a of the disc 22.

Figure 6:
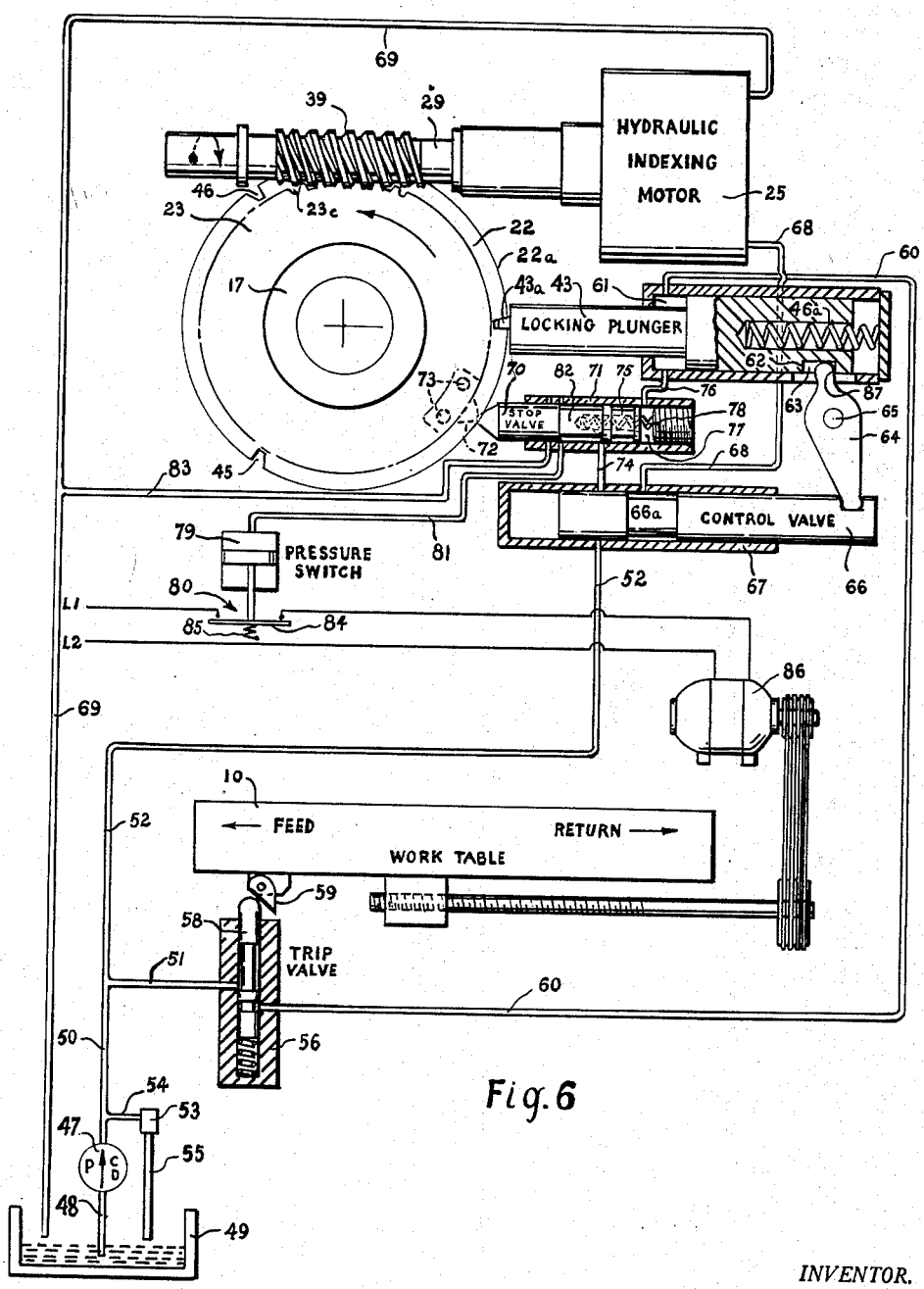
Figure 6 is a hydraulic circuit diagram of the operating mechanism for the rotary work holder.

Considering the general operation of the indexing work holder or index base 17, referring to Figure 6, fluid pressure means are provided for effecting the indexing movements in timed relationship with the movement of a machine member. The main source of fluid pressure is derived from a fluid pressure pump 47 which receives fluid through a suction line 48 from a suitable fluid reservoir 49 and transmits pressure through the pressure supply line 50 to the branch lines 51 and 52, a suitable pressure relief valve 53 connected to the line 50 by the branch line 54 and discharging through a suitable line 55 back to the reservoir 49 serves to maintain proper pressure in the pressure supply lines 50 and 52. Each indexing motion of the rotary work support 17 is instituted preferably in timed relation with the machining cycle of the machine. In order to best accomplish this result the indexing movement is initiated by the movement of a machine member, usually the work table 10 carrying the rotary work holder 17.

A trip valve 56 is provided which may be appropriately secured to the machine base 13 by suitable screws 57, Figure 1, having a valve plunger 58 which may be depressed by a latch dog 59 of conventional design. This dog is adapted to depress the plunger 58 during the beginning of the feeding movement of the work table 10 but is ineffective to operate the valve plunger 58 as the table 10 returns to its initial starting position at the completion of the cutting cycle. Thus, as the table is started in feeding movement by appropriate control means (not shown), the plunger 58 is depressed so as to connect the pressure supply line 51 to the line 60 which connects with the pressure chamber 61 behind the locking plunger 43 so as to cause this plunger to be moved away from the index disc 22 to permit its free rotation. Continued movement of the locking plunger causes an abutment surface 62 formed by a notch 63 in the locking plunger 43 to ultimately contact and actuate a lever 64 pivotally mounted on a suitable pin 65 carried in the housing 14. Actuation of this lever 64 by the withdrawing movement of the locking plunger 43 causes the control valve plunger 66 of the control valve 67 to be moved so as to connect the pressure line 52 through the annular groove 66a with the intake line 68 of the hydraulic indexing motor 25 to cause rotation of this motor and thereby the worm shaft 29 and its worm 39 to rotate the work holder 17 to its next indexed position. Discharge from the motor 25 passes out through the drain line 69 for return of fluid to reservoir 49.

Upon rotation of the index disc 22 from the position shown in Figures 4 and 6, stop cam point 72 fixed to the underside of the indexing disc 22 by suitable screws 73 moves out of engagement with plunger 70. Fluid pressure is at all times connected from the chamber 61 through the line 60 by means of a line 76 connected to the pressure chamber 77 behind the plunger 70 of the valve 71 so as to assist the compression spring 78 in advancing the stop valve to its outward projected position, upon departure of the cam 72, thus blocking off line 74 by valve groove 75.

When the valve plunger 70 is thus extended it connects pressure chamber 79 of a pressure switch 80 through a line 81 a cam annular groove 82 and line 83 to the drain line 69 to permit its line contactor 84 under the influence of a suitable compression spring 85 to complete the circuit in the line L1 going to the prime mover 86 for driving the work table 10 and the other operative elements of the machine. This circuit may be temporarily completed by conventional means, such as a push button connected in parallel with the line contactor 84 to start the operation of the cycle.

It is apparent that the plunger 58 of the trip valve 56 will only be momentarily depressed during the forward feeding movement of the work table 10 and as soon as it is again released the line 60 will be closed to pressure from the line 51 and the locking plunger will then be brought under the influence of the compression spring 46a and to thus be urged toward the index disc. Under these conditions, the outer end 43a of the locking plunger will contact against the periphery 22a of the index disc 22 and will be yieldingly held thereagainst by the spring 46a as the index disc is being rotated by the hydraulic motor 25. The control valve plunger 66 at this time is held in a position with the end of the locking plunger 43 riding on the periphery of the index disc 22 so that pressure will be delivered from the line 52 into the line 68 to maintain rotation of the hydraulic indexing motor.

As the index disc rotates, the next indexing notch will come into position with the end 43a of the locking plunger which will immediately drop therein under the influence of the spring 46a. The mating tapered surface 45b of the index notch and 43c of the locking plunger 43 will again force the radial faces 43b and 44a of the locking plunger 43 and index notch disc 22 into accurate engagement for again positioning the work holder in a desired indexed position.

As a result of this return movement of the plunger 43 into the next notch 45 the control valve 66 will again be moved to the position shown in Figure 6 by engagement of the abutment surface 87 of the notch 63 with the other side of the lever 64. Thus, the supply of fluid pressure from the line 52 to the hydraulic motor 25 will be cut off. There will, however, be a certain amount of stored-up inertia in the hydraulic motor which will cause it to continue to rotate somewhat after the fluid has been cut off by the control valve 66. This will cause the worm 39 to continue to rotate while the index disc 22 and connected worm wheel 23 are locked against rotation by the locking plunger 43. As a result, the worm shaft 29 will be shifted axially, to the right in Figure 4, to compress the spring 41 against its plunger 40 until the worm shaft 29 has moved to the position shown in Figure 4 with its collar 33 in abutting engagement with the bearing 31.

After tripping the plunger 58 of the trip valve 56 the work table then continues its feeding movement, driven by the prime mover 86, to effect engagement of work and tool and upon completion of the cutting operation suitable control means (not shown) are operated to stop the forward feeding movement and effect the return motion of the work table 10. As mentioned, the latch dog 59 is of such design that the return motion will not effect or depress the plunger 58 of the trip valve 56.

The next indexing operation is now ready to take place which is instituted by the next forward feeding motion of the work table 10 which trips the valve plunger 58 of the trip valve 56 so as to apply pressure behind the locking plunger 43 to withdraw it from the indexing disc 22. It is to be noted that when the locking plunger is thus withdrawn from the index disc that the spring 41 operating against its plunger 40 will instantly axially move the worm shaft 29 to the left in Figue 4 to bring its collar 36 into engagement with the bearing 32 and thus initially rapidly move the index notch from under the locking plunger 43 so that even by a very rapid substantially instantaneous actuation of the trip plunger 58 of the trip valve 56 the locking plunger will be withdrawn and the index disc initially rapidly moved a small amount so that the locking plunger 43 may rapidly return into engagement with the periphery of the indexing disc 22 without the danger of reentering the same index notch from which it was just withdrawn. The hydraulic indexing motor 25 is then put into operation as described to index the rotary work holder 17 to the next index work position.

In order to automatically bring the entire machine to a stop after the work holder 17 has moved around a predetermined number of index positions or has returned again to the initial starting position, the stop valve actuating dog point 72 engages the plunger 70 of the stop valve to move it to the position shown in Figure 6 whereby the pressure switch 80 has its pressure chamber 79 connected through the line 81 and the annular groove 82 of the valve plunger 70 to the pressure line 74 to open the pressure switch 80 and disconnect the main power supply to the prime mover 86 and thus stop the operation of the machine. Thus, after the desired number of indexing operations have taken place the entire machine is automatically brought to a stop so as to avoid the danger of again remachining over the same indexed positions which would result in inaccuracies and marring of the work surface.

Figure 5:
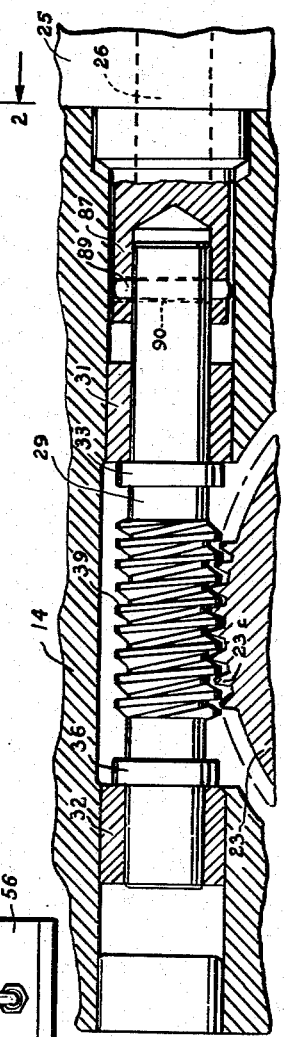
Figure 5 is a fragmentary horizontal section on the line 5—5 of Figure 2.
Figure 3:
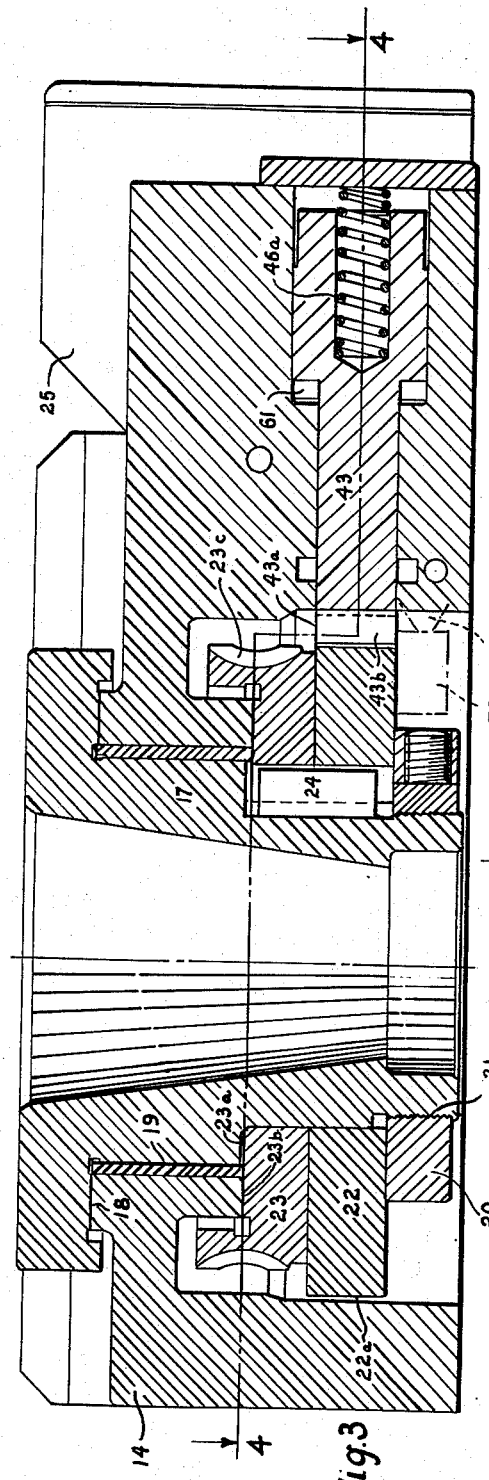
Figure 3 is a vertical longitudinal section on the line 3—3 of Figures 1, 2 and 4.
Figure 2:
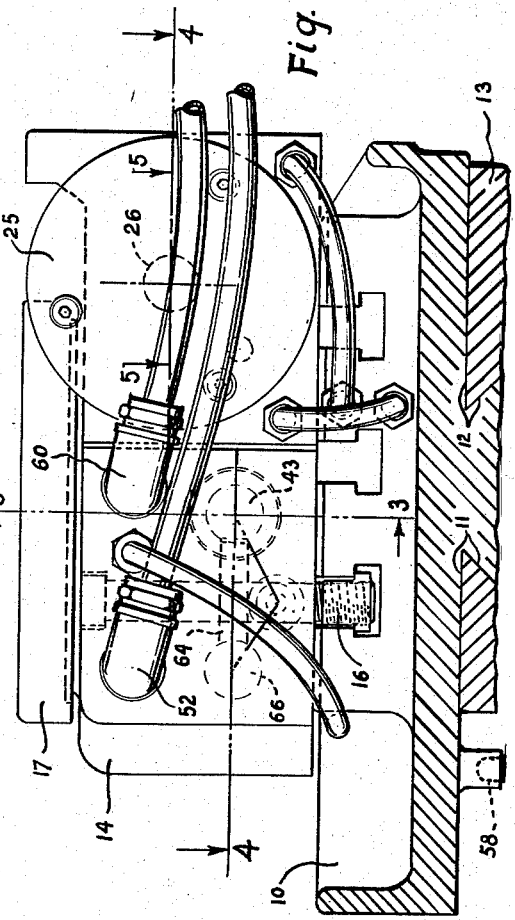
Figure 2 is a right hand end view, partly in section on the line 2—2 of Figure 1, of the work table and the rotatable work support or index base mounted thereon.

It is also practicable to utilize a structure in which the worm shaft 29 is not susceptible to yieldable axial movement. Such a structure is shown in Figure 5, in which the hydraulic indexing motor 25 has its shaft 26 directly connected by means of the coupling 87 and the pin 88 nicely fitted in a bore 90 in the end of the worm shaft 29. Also the spools 33 and 36 formed integral with the worm shaft 29 are now confined between the bearings 31 and 32 so as to permit rotation of the worm shaft 29 but to confine it against axial movement in the housing 14. With this arrangement it is then desirable to arrange the movement of the locking plunger 43 with respect to the control valve 66 in such a way that at the instant the end portion 43a of the locking plunger leaves the index disc fluid pressure is being applied in the line 68 to effect rotation of the indexing motor 25 so that immediately upon release of the trip plunger 58 of the trip valve 56 by movement of the work table 10 the index notch will have been partially moved away from under the locking plunger to prevent the plunger from again reentering the index notch from which it was just withdrawn. The function of the stop valve at the completion of a desired number of index movements will take place in the same manner as described above.

As previously stated, the conventional control means for the table transmission and motor with the exception of the pressure switch are not shown because they form no part of the present invention, and it will be obvious to those skilled in the art that in restarting the table transmission that a suitable by-pass switch connection around the pressure switch such as a manually operable push button switch or other suitable switch connection well known in the art will be provided for restarting purposes.

There has thus been provided an improved indexing work holder or index base for use on a machine tool or milling machine work table which is capable of rapid and safe operation to a series of indexed positions; and which provides means for slight rotation of the work holder prior to the power rotation thereof; and to provide means in conjunction with such an indexing apparatus for automatically arresting the operation of the machine at the completion of a desired number of indexing movements; the entire above operation being instituted by trip actuated mechanism rendered operative by the movement of a machine member.

What is claimed is:

1. In a machine tool, a work table, a prime mover for actuating said work table, an indexible work holder, a driving motor for moving said work holder to indexed positions, a yieldable driving connection between said motor and said work holder, a locking plunger mechanism arranged to cooperate with said work holder for accurately holding said work holder in indexed positions, means rendered operative by the movement of said work table to initially withdraw said locking plunger, means rendered operative upon initial withdrawal of said locking plunger to effect a limited amount of indexing movement in said work holder while said driving motor is inoperative, and means responsive to withdrawal of said locking plunger from positioning said work holder to effect rotation of said motor.

2. In a machine tool having a work table and a prime mover for actuating said work table, an indexing work holder mounted on said work table having actuating mechanism including the combination of a hydraulic driving motor for rotating said work holder to indexed positions, a locking plunger movable into engagement with said work holder to position and hold said work holder in said indexed positions, a control valve operated by the disengagement of said locking plunger from the work holder to connect fluid pressure to actuate said hydraulic driving motor, means trip operable by the table for effecting momentary withdrawal of the locking plunger means on the work holder for holding said locking plunger in withdrawn position so as to maintain said control valve effective to continuously deliver fluid pressure to said hydraulic indexing motor, and means operable by the movement of said work holder to a predetermined index position for rendering the prime mover for actuating said work table inoperative.

3. In a hydraulically actuated indexing mechanism for a machine tool having a work table, a prime mover for actuating said work table, a rotatable member to be indexed to a series of predetermined locations, a hydraulic driving motor, a worm driven by said driving motor, means permitting resilient axial movement of said worm, a worm wheel mounted on said rotatable member, a locking plunger movable into engageemnt with the periphery of an indexing notch disc fixed on said rotatable member, indexing notches in said disc to receive said locking plunger for positioning said rotatable member in indexed locations, the combination of a stop control means for rendering said prime mover for actuating the work table operative or inoperative, a dog point on said rotatable member for rendering said stop means effective after a predetermined amount of rotation of said rotatable member, fluid pressure means for withdrawing said locking plunger, means rendered operative by the withdrawal of said locking plunger to cause said driving motor to become operative, and means whereby said resilient axial movement of said worm effects initial indexing rotation in said rotatable member upon withdrawal of said locking plunger from an indexing notch in said indexing disc.

4. In an indexing mechanism for a rotatable member to be moved to a series of indexed locations, a driving motor, a worm driven by said motor, means permitting limited axial movement in said worm, resilient means for urging said worm axially in driving direction, a worm wheel on said rotatable member meshing with said worm whereby both axial and rotary movement of said worm effects rotation of said worm wheel, a locking plunger cooperating with indexing notches in said rotatable member adapted to be engaged by said locking plunger for positively holding said member in said indexed positions, means whereby the withdrawal of said locking plunger from an indexing notch permits the resilient axial movement of said worm to initially rotate said rotatable member, means whereby further withdrawal of said locking plunger causes said driving motor to take up rotation of said rotatable member while said worm is held in axially displaced position, and means whereby the engagement of said locking plunger in an indexing notch to arrest rotation of said rotatable member disconnects power from said driving motor, and means whereby said resilient means permits limited continued rotation of said driving motor while axially shifting said worm in the opposite direction against its resilient actua;tng means.

5. In an actuating means for a rotatable member to be indexed to a series of predetermined positions, a worm wheel on said rotatable member, an axially movable worm in mesh with said worm wheel, means permitting limited axial movement of said worm, resilient means for normally moving said worm axially in a direction to rotate said worm wheel in indexing direction, a hydraulic driving motor arranged to rotate said worm, a locking plunger adapted to engaged indexing notches provided in said rotatable member for positively positioning said member, a source of fluid pressure, means for connecting said source of fluid pressure to withdraw said locking plunger from an indexing notch, means rendered operative by the movement of said locking plunger from an indexing notch to connect said source of fluid pressure to said hydraulic driving motor to rotate said worm, means for mechanically holding said locking plunger in withdrawn position to render said hydraulic driving motor continuously operative, means whereby the insertion of said locking plunger in an indexing notch disconnects said fluid pressure from operating said hydraulic driving motor, means whereby said resilient means for axially moving said worm permits continued rotation of said hydraulic driving motor after fluid pressure has been disconnected therefrom by engagement of said locking plunger in an indexing notch so as to axially shift said worm against its resilient means while said rotatable member is held against rotation by said locking plunger, and means whereby the withdrawal of said locking plunger from an index notch permits said resilient means to axially move said worm while said hydraulic indexing motor is inoperative to effect an initial indexing movement in said rotatable member.

6. In an indexing mechanism for a machine tool, a housing, a work holder journaled in said housing, a worm wheel fixed on said work holder, a worm journaled in operative engagement with said worm wheel for axial movement in said housing, a spring resiliently urging said worm axially in a direction opposed to the axial thrust imparted to said worm in rotating said worm wheel, a unidirectional driving motor fixed on said housing connected in positive rotary driving relationship with said worm, an indexing disc fixed on said work holder having notches therein, a locking plunger movably mounted in said housing for locking engagement with said notches, a source of power for operating said motor, control means for said source of power, and means actuated by the movement of said locking plunger to operate said control means.

7. In a machine tool, a work table, a prime mover for actuating said work table, an indexing work holding device mountable on said table comprising a housing fixed to said work table, a work holder journaled in said housing, a worm wheel fixed on said holder, a worm journaled in operative engagement with said worm wheel and axially movable in said housing tangentially of said worm wheel, a spring normally moving said worm axially in a direction opposed to the axial thrust imparted to said worm in rotating said worm wheel, a unidirectional driving motor fixed on said housing connected in positive rotary driving relationship with said worm, an indexing abutment disc fixed on said work holder, indexing abutments on said disc, a locking plunger movably mounted in said housing for engagement with said abutments, a source of power for operating said motor and for actuating said locking plunger, means including a control device actuated by the movement of said work table for connecting said source of power to said locking plunger, and further means including a second control device actuated by the movement of said locking plunger for connecting said source of power to said driving motor.

8. In a machine tool, a work table, a prime mover for actuating said work table, an indexing work holding device mountable on said table comprising a housing fixed to said work table, a work holder journaled in said housing, a worm wheel fixed on said holder, a worm journaled in operative engagement with said worm wheel and axially movable in said housing tangentially of said worm wheel, a spring normally moving said worm axially in a direction opposed to the axial thrust imparted to said worm in rotating said worm wheel, a unidirectional driving motor fixed on said housing connected in positive rotary driving relationship with said worm, an indexing abutment disc fixed on said work holder, indexing abutments on said disc, a locking plunger movably mounted in said housing for engagement with said abutments, a source of power for operating said motor and for actuating said locking plunger, means including a control device actuated by the movement of said work table connecting said source of power to said locking plunger, further means including a second control device actuated by the movement of said locking plunger connecting said source of power to said driving motor, a second source of power for operating said prime mover, and means including a third control device operated by the rotation of said work holder to a predetermined position for disconnecting said second source of power from said prime mover.

9. In an indexing mechanism for a machine tool, a housing, a work holder journaled in said housing, a worm wheel fixed on said work holder, a worm journaled in operative engagement with said worm wheel for axial movement in said housing, a spring resiliently urging said worm axially in a direction opposed to the axial thrust imparted to said worm in rotating said worm wheel, a unidirectional hydraulic motor fixed on said housing and connected in positive rotary driving relationship with said worm, an indexing abutment disc fixed on said tool holder, indexing abutments on said disc, a hydraulically operated locking plunger movably mounted in said housing for engagement with said abutments, a source of fluid pressure for operating said motor, a hydraulic control valve for regulating the supply of fluid pressure to said hydraulic motor from said source of fluid pressure, and means for actuating said control valve by the movement of said locking plunger.

10. In a machine tool, a work table, an electric driving motor for actuating said work table, an indexing work holding device mountable on said table comprising a housing fixed to said work table, a work holder journaled in said housing, a worm wheel fixed on said work holder, a worm journaled in operative engagement with said worm wheel and axially movable in said housing tangentially of said worm wheel, a spring normally moving said worm axially in a direction opposed to the axial thrust imparted to said worm in rotating said worm wheel, a unidirectional hydraulic motor fixed on said housing and connected in positive rotary driving relationship with said worm, an indexing abutment disc fixed on said work holder, indexing abutments on said disc, a hydraulically actuated locking plunger mounted in said housing for engagement with said abutments, a source of fluid pressure for operating said hydraulic motor and for actuating said locking plunger, means including a hydraulic control operated by the movement to said work table to control the supply of fluid pressure from said source of fluid pressure to said locking plunger, and further means including a hydraulic control valve operated by the movement of said locking plunger controlling the supply of fluid pressure from said source of fluid pressure to said driving motor.

11. In a machine tool, a work table, an electric driving motor for actuating said work table, an indexing work holding device mountable on said table comprising a housing fixed to said work table, a work holder journaled in said housing, a worm wheel fixed on said work holder, a worm journaled in operative engagement with said worm wheel and axially movable in said housing tangentially of said worm wheel, a spring normally moving said worm axially in a direction opposed to the axial thrust imparted to said worm in rotating said worm wheel, a unidirectional hydraulic motor fixed on said housing and connected in positive rotary driving relationship with said worm, an indexing abutment disc fixed on said work holder, indexing abutments on said disc, a hydraulically actuated locking plunger mounted in said housing for successive engagement with said abutments, a source of fluid pressure for operating said hydraulic motor and for actuating said locking plunger, means including a hydraulic control valve operated by the movement of said work table to control the supply of fluid pressure from said source of fluid pressure to said locking plunger, further means including a hydraulic control valve operated by the movement of said locking plunger controlling the supply of fluid pressure from said source of fluid pressure to said driving motor, a source of electric power for operating said electric driving motor, and a fluid pressure operated control switch interconnected between said source of electric power and said motor operated by the rotation of said work holder to a predetermined position to control the application of electric power to said electric motor.

12. A rotary indexing table attachment for a machine tool comprising a rotatable table, an indexing means therefor including the combination of a unidirectional driving motor, a worm gear attached to the table, a driving worm for connecting the motor to said gear, said worm being supported for relative axial movement with respect to said motor, yielding means to prevent said axial movement, a positive drive connection between said motor and said worm, an abutment surface formed integral with the table, a locating plunger having a mating abutment surface engageable with the first-named surface, said yielding means being operative to normally maintain said abutment surfaces in engagement, means for starting and stopping rotation of said driving motor, means connecting said plunger and effective upon its withdrawal to cause operation to said starting means and to release said yielding means whereby said yielding means will cause a slight rotation of said support before power is applied to said motor.

13. In a machine tool, a movable work table, an indexable work holder mounted on said table, a unidirectional driving motor for rotating said work holder to effect indexing thereof, connecting means between the motor and said work holder including a driving member having a positive driving connection with said motor, resilient means normally holding said driving member against axial movement during the application of driving torque thereto, a positioning means for accurately locating said work holder in its indexed positions, means to effect withdrawal of said positioning means from engagement with said work holder whereby said resilient means will cause a slight rotation of said work holder, means responsive to withdrawal of said positioning means to start operation of said motor, and means responsive to return of said positioning means to stop operation of said motor, the coasting of said motor after disconnection of power therefrom effecting loading of said resilient means.

14. In a machine tool, a movable work table, a rotatable indexable work holder mounted on said table, a unidirectional driving motor for indexing said work holder, a driving connection between said motor and work holder including a shaft subject to axial movement upon application of driving torque thereto, resilient means opposing said driving torque, a positioning means for locating said work holder in indexed position, means responsive to movement of the work table to effect retraction of said positioning means whereby said resilient means will impart a slight rotation to said work holder, means responsive to withdrawal of said positioning means to connect a source of power to said motor, and means responsive to continued movement of the table to release said positioning means and simultaneously disconnect power from said motor whereby said motor will coast to a stop and simultaneously load said resilient means for operation upon the next indexing operation.

15. In a power operable indexing mechanism, the combination with a rotatable work holder, of a unidirectional driving motor, a driving connection between the motor and the work holder which is connected for positive rotation by the motor but subject to axial movement upon application of a driving torque thereto, resilient means opposing said driving torque, a locking plunger cooperating with said work holder for positioning it in indexed positions, means responsive to withdrawal of the plunger for starting said motor and releasing said resilient means to effect a slight rotation of the work holder before application of power to said motor, and means responsive to return of said plunger to disconnect power from said motor and effect sudden stopping of said work holder whereby the motor will overrun the work table producing excessive torque to load said resilient means.

HAROLD R. SODEN.

REFERENCES CITED

The following references are of record in the file of this patent:

UNITED STATES PATENTS

| Number | Name | Date |
|---|---|---|
| 1,975,008 | Kingsbury | Sept. 25, 1934 |
| 2,011,486 | Kingsbury | Aug. 13, 1935 |
| 2,329,756 | Granberg et al. | Sept. 21, 1943 |
| 2,355,082 | Kearney et al. | Aug. 8, 1944 |

FOREIGN PATENTS

| Number | Country | Date |
|---|---|---|
| 375,577 | Great Britain | June 30, 1932 |
| 377,029 | Great Britain | July 21, 1932 |
| 479,701 | Great Britain | Feb. 10, 1938 |